LE ROY WILLOUR.
JACK.
APPLICATION FILED DEC. 18, 1918.
Reissued Mar. 4, 1919.
14,605.
2 SHEETS—SHEET 1.
FIG. 1
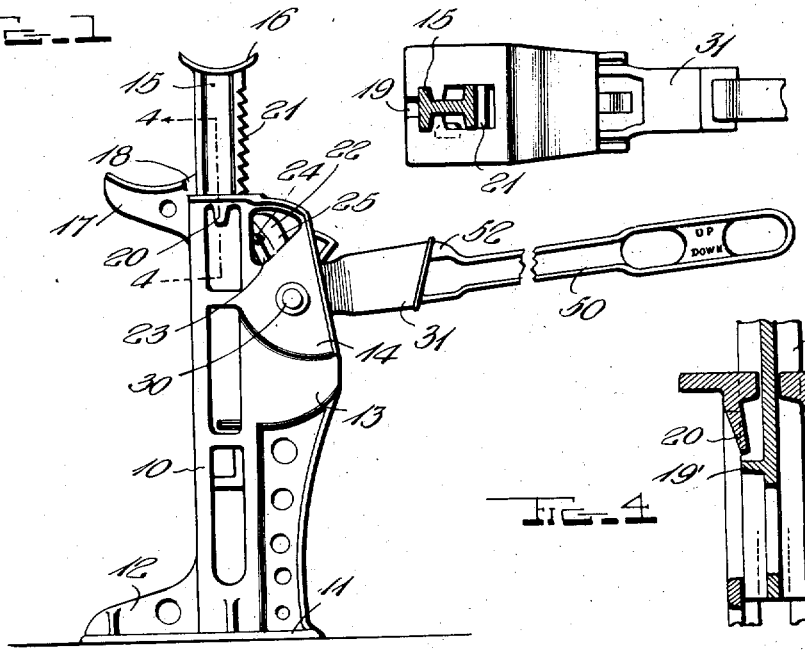
FIG. 3
FIG. 4
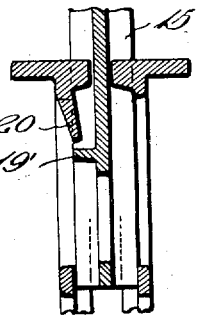
FIG. 2
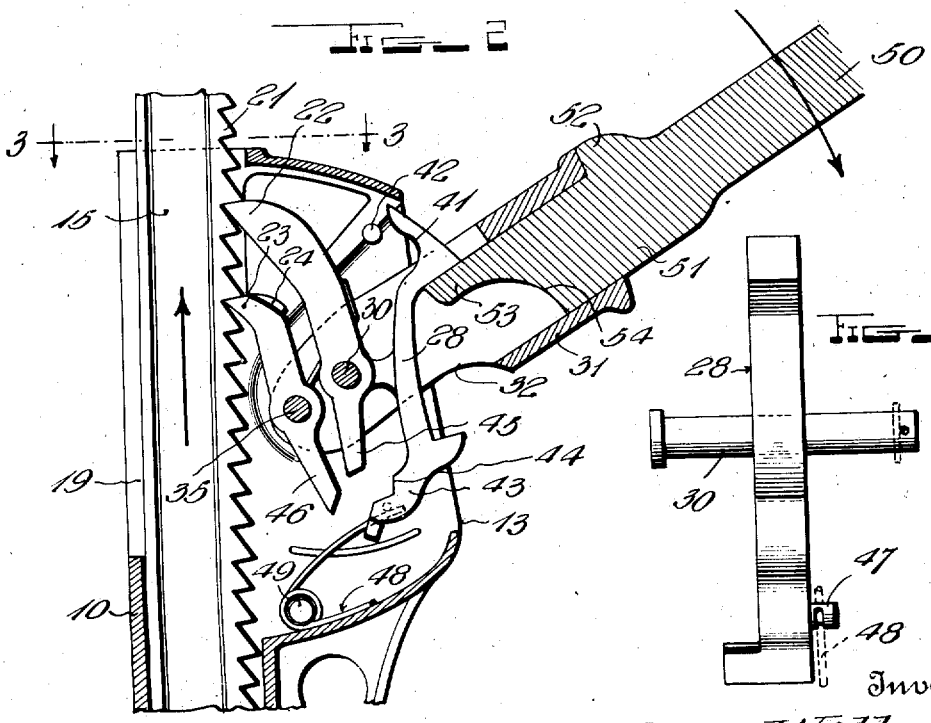
FIG. 5
Inventor
LeRoy Willour
By C. L. Parker.
Attorney LE ROY WILLOUR.
JACK.
APPLICATION FILED DEC. 18, 1918.
Reissued Mar. 4, 1919.
14,605.
2 SHEETS—SHEET 2.
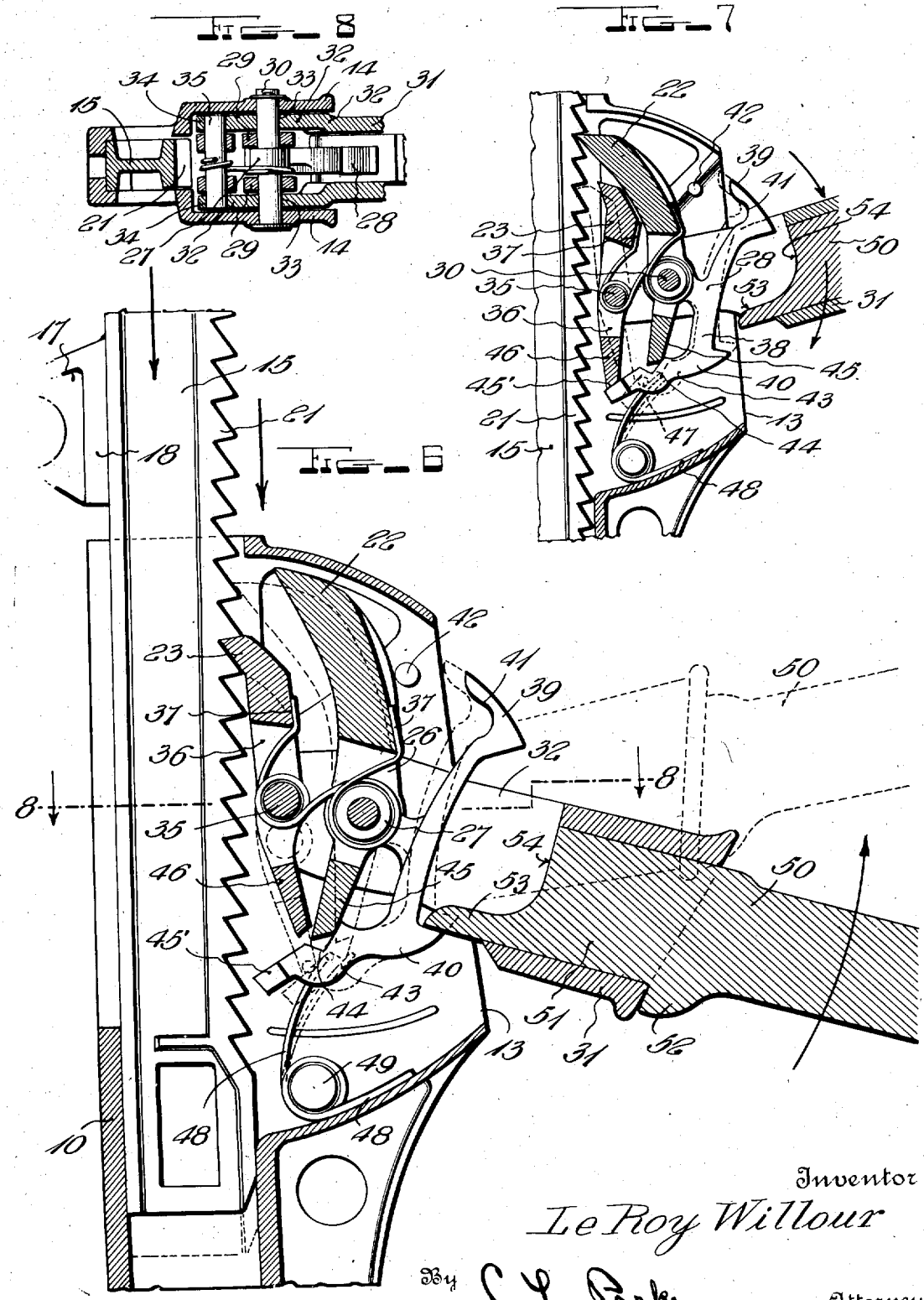
Inventor
Le Roy Willour
By C. L. Parker.
Attorney

UNITED STATES PATENT OFFICE.

LE ROY WILLOUR, OF ASHLAND, OHIO, ASSIGNOR TO THE ASHLAND PRODUCTS CO., OF ASHLAND, OHIO, A CORPORATION OF OHIO.

JACK.

14,605. Specification of Reissued Letters Patent. Reissued Mar. 4, 1919.

Original No. 1,240,278, dated September 18, 1917, Serial No. 171,976, filed May 31, 1917. Application for reissue filed December 18, 1918. Serial No. 267,399.

*To all whom it may concern:*

Be it known that I, LE ROY WILLOUR, a citizen of the United States, residing at Ashland, in the county of Ashland and State of Ohio, did invent certain new and useful Improvements in Jacks; and it is hereby declared that the following is a full, clear, and exact description of the invention, such as will enable others skilled in the art to which it appertains to make and use the same.

My invention relates to improvements in lifting jacks of the type that embody a plurality of pawls, for raising and lowering the lift bar.

An important object of the invention is to provide means whereby the pawls may be set into action for raising and lowering the lift bar, by a handle having a key or key-extension, which co-acts with a control member, in turn controlling the operation of the pawls.

A further object of the invention is to provide means whereby the jack may be actuated for raising or lowering the lift bar thereof, without necessitating the operator getting under the automobile or other load to be lifted.

Other objects and advantages of the invention will be apparent during the course of the following description.

In the accompanying drawings forming a part of this specification and in which like numerals are employed to designate like parts throughout the same, Figure 1 is a side elevation of a jack embodying my invention, Fig. 2 is a detail central vertical longitudinal section through the upper portion of the jack, showing the pawls and associated elements, with the control member shifted to the inactive position and the operating handle raised, Fig. 3 is a horizontal sectional view taken on line 3—3 of Fig. 2, Fig. 4 is a detail section taken on line 4—4 of Fig. 1, Fig. 5 is a side elevation of a control-member, Fig. 6 is a central vertical longitudinal sectional view through the upper portion of the jack, showing the control member having its lower end shifted inwardly, and the handle in the lowered position, the pawls serving to lower the lift bar, Fig. 7 is a similar view, with the handle moved to the upper position, and, Fig. 8 is a horizontal sectional view taken on line 8—8 of Fig. 6.

In the drawings, wherein for the purpose of illustration is shown a preferred embodiment of my invention, the numeral 10 designates a tubular standard, provided at its lower end with a foot or base 11, having suitable reinforcing webs 12. Formed upon the upper portion of the tubular standard 10 and upon one side thereof, is a housing 13, comprising spaced sides 14.

The numeral 15 designates a lift-bar, mounted to slide within the tubular standard 10 and provided at its top with a head 16. The lift-bar 15 is also provided beneath this head with a laterally projecting head 17, having a shank 18, operating through a longitudinal slot 19, in one side of the tubular standard 10. The lift-bar 15 may be provided at its lower end and upon one side thereof (see Fig. 4) with a laterally extending stop 19′, disposed to contact with an inwardly bent finger 20, carried by the upper end of the tubular standard 10.

The lift-bar 15 is provided upon one longitudinal side thereof with downwardly faced ratchet teeth 21, adapted to engage with an upper holding pawl 22 and a lower operating pawl 23. The operating pawl 23 is provided with a laterally projecting extension or lug 24, arranged within an opening 25, whereby the pawl 23 may be moved outwardly, contacting with the pawl 22, thus bringing both pawls out of engagement with the ratchet teeth 21, and allowing the lift-bar 15 to drop.

The holding pawl 22, as more clearly shown in Figs. 6 and 7, is provided at its lower end with a recess 26, receiving a knuckle 27, carried by or rigidly secured to a control member 28. The sides or walls 29 of the recess 26 are apertured for the reception of a pivot element 30, passing through the knuckle 27, and the side walls 14. It is thus apparent that the element 30 pivots the holding pawl 22 with the casing 13.

The numeral 31 designates a tubular handle-socket, the forward end of which is provided with spaced ears 32. The ears 32 are provided at points near and spaced from their free ends with apertures 33, pivotally receiving the pin or element 30. The ears 32 are provided at their extreme forward ends with apertures 34, receiving a pivot element 35, upon which is pivoted the operating pawl 23. This operating pawl has a recess 36. The pawls 22 and 23 are moved toward the ratchet teeth 21 by the ends 37 of a spring coiled about the pins 30 and 35, as shown. This spring however does not act upon the control-member 28.

The control-member 28 has an approximately U-shaped body portion 38, provided with heads 39 and 40. The head 39 has a recess 41 formed upon the rear side thereof, adapted for the reception of a stationary stop element 42, carried by the casing 13, and serving to positively limit the swinging movement of the head 39 in the forwardly direction. The head 40 is provided with a forwardly and downwardly projecting extension 43, having a recess or notch 44, for the reception of a depending shank 45, rigidly secured to the lower end of the pawl 22. The extension 43 also has an inclined cam face 45′, to contact with the end of an extension 46, rigidly secured to the lower end of the pawl 23. The extension 43 is further provided with a trunnion or lug 47, to contact with a spring 48, coiled about a lug or trunnion 49, formed upon the casing 13. This spring 48 is stiffer than the spring 37 and is adapted to overcome the same, and the function of the spring 48 is to swing the head 40 of the control-member 28 forwardly, thus causing the pawls 22 and 23 to disengage the ratchet teeth 21, in proper order, as will be more fully explained.

The numeral 50 designates an operating lever, provided with a reduced shank 51 to enter the socket 31 and having a stop flange 52. The shank 51 is provided with a key or key-extension 53, upon the forward end thereof and at one edge. This key-extension affords a recess 54.

The operation of the jack is as follows: To raise the lift-bar 15, the shank 51 of the lever 50 is inserted into the handle socket 31, with the key-extension 53 arranged uppermost. This key-extension 53 cannot now contact with the head 40 but may contact with the head 39. The operating pawl 23, upon the down stroke of the handle socket will engage with a selected ratchet tooth 21, thereby raising the lift-bar a notch. The holding pawl 22 trips over the next tooth 21, for holding the lift-bar against downward movement. When the handle socket 31 is swung upwardly, the key-extension 53 contacts with the head 39, swinging the control-member 28 in a corresponding direction, whereby the shank 46 of the pawl 23 will not contact with the cam face 45′, and the pawl 23 will therefore trip over the next lower ratchet tooth 21 and engage therebeneath, to again elevate the lift-bar 15 for a notch, upon the down stroke of the socket lever 37.

For lowering the lift-bar 15, the operating handle 50 is removed and inverted, so that the key-extension 53 will be arranged lowermost with respect to the control-member. This key-extension is now adapted to contact with the head 40 but cannot contact with the head 39. Upon the down stroke of the handle socket 31, the pawl 23 rises and takes the load off of the pawl 22, while the key-extension 53 contacts with the head 40, thus swinging the head 40 forwardly beyond its normal inner position (as the head 40 is not swung forwardly sufficiently by the spring 48 to overcome the tension of the spring of the pawl 22). The shank 45 of the pawl 22 will now engage within the recess or notch 44, and the pawl 22 swung out of engagement with the tooth 21. Upon the up stroke of the handle socket 31 the key-extension 53 and associated elements retain the holding pawl 22 in the outer position sufficiently whereby it will not engage beneath the adjacent tooth but beneath the tooth thereabove it, whereby the lift-bar 15 is lowered a notch, as the operating pawl 23 descends. The spring 48 now retains the control-member 28 in the active position, with its extension 43 in the most forwardly position. Therefore, as the operating pawl 23 descends, carrying the load of the lift-bar 15, the shank 46 of the operating pawl contacts with the cam face 45′. As soon as the load is taken by the holding pawl 22, as above indicated, the cam face 45′ will swing the pawl 23 rearwardly, out of engagement with the ratchet tooth. This cam face retains the pawl in this rearward position upon the up stroke of the socket lever 37, whereby the operating pawl does not engage beneath the adjacent tooth, but beneath the tooth next above, this pawl thereby not elevating the lift-bar 15 for a notch, upon the up stroke of the handle socket 31, but elevating it sufficiently at or near the end of the up stroke to take the load off of the pawl 22.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A lifting jack of the character described, comprising a standard, a lift-bar having slidable contact therewith and provided with a longitudinal set of teeth, a holding pawl connected with the standard and adapted to engage the teeth and having a shank, an operating pawl adapted to engage the teeth and having a shank, a handle socket pivotally connected with the standard and pivotally carrying the operating pawl, yielding means to hold the pawls in contact with the teeth, a pivoted control-member arranged to contact with the shanks of the pawls, means to swing the pivoted control-member in one direction upon its pivot, and a lever adapted for insertion within the handle socket and having a key adapted to alternately contact with opposite ends of the control-member when the lever is reversed.

2. In a lifting jack of the character described, a standard, a lift-bar having slidable contact therewith and provided with a longitudinal set of teeth, a pair of pawls associated with the standard and adapted to contact with the teeth, a handle socket pivotally connected with the standard and pivotally carrying one pawl, yielding means to move the pawls into contact with the teeth, a control-member pivotally connected with the standard and adapted to contact with portions of the pawls, and thereby control their operation, yielding means to swing the pivoted control-member in one direction upon its pivot, and a handle adapted for insertion within the handle socket and provided with a key to alternately contact with spaced portions of the control-member, said key being laterally shiftable into and out of the active position by turning the handle upon its longitudinal axis.

3. In a lifting jack of the character described, a standard, a lift-bar having slidable contact therewith and provided with a longitudinal set of teeth, a pair of pivoted pawls associated with the standard and adapted to contact with the teeth and provided at their pivoted ends with depending shanks extending downwardly below the pivots, a handle socket pivotally connected with the standard and carrying one pawl, yielding means to move the pawls into engagement with the teeth, a control-member pivotally connected with the standard and provided near its opposite ends with heads and near its lower end with an extension adapted to contact with the shanks of the pawls, yielding means to swing the control member in one direction, and a handle adapted for insertion within the handle socket and having a key to project between said heads and contact therewith.

4. In a lifting jack of the character described, a standard, a lift-bar having slidable contact therewith and provided with a longitudinal set of teeth, a handle socket pivotally connected with the standard, a pair of pawls pivoted to the handle socket and contacting with the teeth and carrying depending shanks, yielding means to move the pawls into contact with the teeth, a control-member pivotally connected with the standard and provided at its ends with heads and at its lower end with an extension to contact with the shanks of the pawls, yielding means to swing the control-member in one direction, and a handle adapted for insertion within the handle socket and provided at one edge thereof with a key-extension having a recess formed upon side of the key-extension, said key-extension being adapted for arrangement between the heads.

5. In a lifting jack of the character described, a standard, a lift-bar having slidable contact therewith and provided with a longitudinal set of teeth, a pair of pivoted pawls associated with the standard and adapted to contact with the teeth and carrying shanks, yielding means to move the pawls into contact with the teeth, a control member pivoted to the standard and provided near its ends with contact elements and at its lower end with an extension to contact with the shanks, yielding means to swing the control member in one direction, a lever pivotally connected with the standard and carrying one pawl, and a key adapted for connection with the lever and to be arranged between the contact elements.

6. A lifting jack of the character described, comprising a standard, a lift bar slidably contacting therewith and provided with a longitudinal set of teeth, a holding pawl connected with the standard to engage the teeth, an operating pawl adapted to engage the teeth, a handle socket pivotally connected with the standard and pivotally carrying the operating pawl, yielding means to move the pawls into engagement with the teeth, a controlling member carried by the standard and separate from and movable with relation to the pawls and disposed near the pawls to contact with portions thereof, means to move the controlling member in one direction, and an operating lever having one end adapted to be inserted within the handle socket, said lever having an extension disposed upon one side of its longitudinal axis to contact with the controlling member, said lever when inserted in one position in the handle socket serving to position the extension so that it coacts with the control member to cause the pawls to move the lift bar in one direction, said lever being adapted to be removed and inserted in the handle socket in an inverted position to position the extension so that it will coact with the control member for causing the pawls to move the lift bar in the opposite direction.

7. A lifting jack of the character described, comprising a standard, a lift bar slidably contacting therewith and provided with a longitudinal set of teeth, a holding pawl connected with the standard to engage the teeth, an operating pawl adapted to engage the teeth, a handle socket pivotally connected with the standard and pivotally carrying the operating pawl, means to move the pawls into contact with the teeth, a single control member separate from and movable with relation to the pawls and carried by the standard in coöperative relation to the pawls to contact with portions thereof, means to move the control member in one direction, and a lever having one end adapted to be inserted within the handle socket and having a longitudinal extension at its forward end, said longitudinal extension being so positioned with respect to the longitudinal axis of the lever that when the lever is inserted within the handle socket in one position such extension will coact with the control member so that it will cause the pawls to move the lift bar in one direction and when the lever is inverted and inserted within the socket member said extension will then coact with said control member so that such control member causes the pawls to move the lift bar in the opposite direction.

LE ROY WILLOUR.

In the presence of—
J. R. Ryder,
C. L. Smith.